United States Patent
Sheriff et al.

(10) Patent No.: US 12,464,400 B2
(45) Date of Patent: Nov. 4, 2025

(54) IMPLEMENTING DETERMINISTIC TRAFFIC DELIVERY IN A TIME-SENSITIVE NETWORKING SYSTEM

(71) Applicant: Cisco Technology, Inc., San Jose, CA (US)

(72) Inventors: Akram Sheriff, Newark, CA (US); Robert E. Barton, Richmond (CA); Jerome Henry, Pittsboro, NC (US); Pascal Thubert, Roquefort-les-Pins (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 291 days.

(21) Appl. No.: 18/361,321

(22) Filed: Jul. 28, 2023

(65) Prior Publication Data

US 2025/0039729 A1     Jan. 30, 2025

(51) Int. Cl.
*H04W 28/02* (2009.01)
*H04L 47/50* (2022.01)

(52) U.S. Cl.
CPC ......... *H04W 28/0231* (2013.01); *H04L 47/50* (2013.01)

(58) Field of Classification Search
CPC ............... H04W 28/0231; H04L 47/50
See application file for complete search history.

(56) References Cited

U.S. PATENT DOCUMENTS

| | | | |
|---|---|---|---|
| 2008/0056221 A1* | 3/2008 | Xu .................. | H04W 72/543 370/342 |
| 2021/0112448 A1* | 4/2021 | Joseph ................. | H04W 28/06 |
| 2021/0219253 A1 | 7/2021 | Van Phan et al. | |
| 2022/0116870 A1 | 4/2022 | Cariou et al. | |
| 2022/0232423 A1 | 7/2022 | Thyagaturu et al. | |
| 2022/0286947 A1 | 9/2022 | Cavalcanti et al. | |

FOREIGN PATENT DOCUMENTS

| | | |
|---|---|---|
| CN | 115225587 A | 10/2022 |
| WO | 201820038 A1 | 11/2018 |

* cited by examiner

*Primary Examiner* — Minh Chau Nguyen
(74) *Attorney, Agent, or Firm* — Baker Botts L.L.P.

(57) ABSTRACT

In one embodiment, a method includes receiving a request from an access point to transmit to a TSN data payload to a wireless TSN station, identifying resource units (RUs) in a downlink channel, each RU comprising a set of RU tones, identifying access category (AC) queues, multiplexing the RUs and AC queues to generate RU and AC queue pairs, generating timing boundaries of the pairs, wherein each timing boundary represents a combination of an average airtime of each RU and an average wait time of each AC queue for transmitting a size of the TSN data payload, iteratively validating the timing boundaries with a TSN lookahead time, and determining a first RU tone from a first RU associated with a first timing boundary less than the TSN lookahead time to transmit the TSN data payload in a first AC queue to the wireless TSN station.

20 Claims, 5 Drawing Sheets

FIG. 2

IMPLEMENTING DETERMINISTIC TRAFFIC DELIVERY IN A TIME-SENSITIVE NETWORKING SYSTEM

TECHNICAL FIELD

The present disclosure relates generally to wireless communication, and more particularly, to achieving deterministic traffic delivery in a time-sensitive networking system.

BACKGROUND

Time-Sensitive Networking (TSN) is a set of standards under development by the Time-Sensitive Networking task group of the IEEE 802.1 working group. The standards define mechanisms for the time-sensitive transmission of data over deterministic Ethernet networks. The majority of projects define extensions to the IEEE 802.1Q—Bridges and Bridged Networks, which describes virtual LANs and network switches. These extensions in particular address the transmission of very low transmission latency and high availability. Applications include converged networks with real-time audio/video streaming and real-time control streams which are used in automotive or industrial control facilities.

The Internet of Things (IOT) describes physical objects (or groups of such objects) with sensors, processing ability, software and other technologies that connect and exchange data with other devices and systems over the Internet or other communications networks. IOT has been considered a misnomer because devices do not need to be connected to the public internet, they only need to be connected to a network, and be individually addressable. The field has evolved due to the convergence of multiple technologies, including ubiquitous computing, commodity sensors, increasingly powerful embedded systems, as well as machine learning. Traditional fields of embedded systems, wireless sensor networks, control systems, and automation (including home and building automation), independently and collectively, enable the IOT.

BRIEF DESCRIPTION OF THE DRAWINGS

FIG. 2 illustrates an example TSN traffic scheduling map for end-to-end determinism.

DESCRIPTION OF EXAMPLE EMBODIMENTS

Overview

Figure 1:
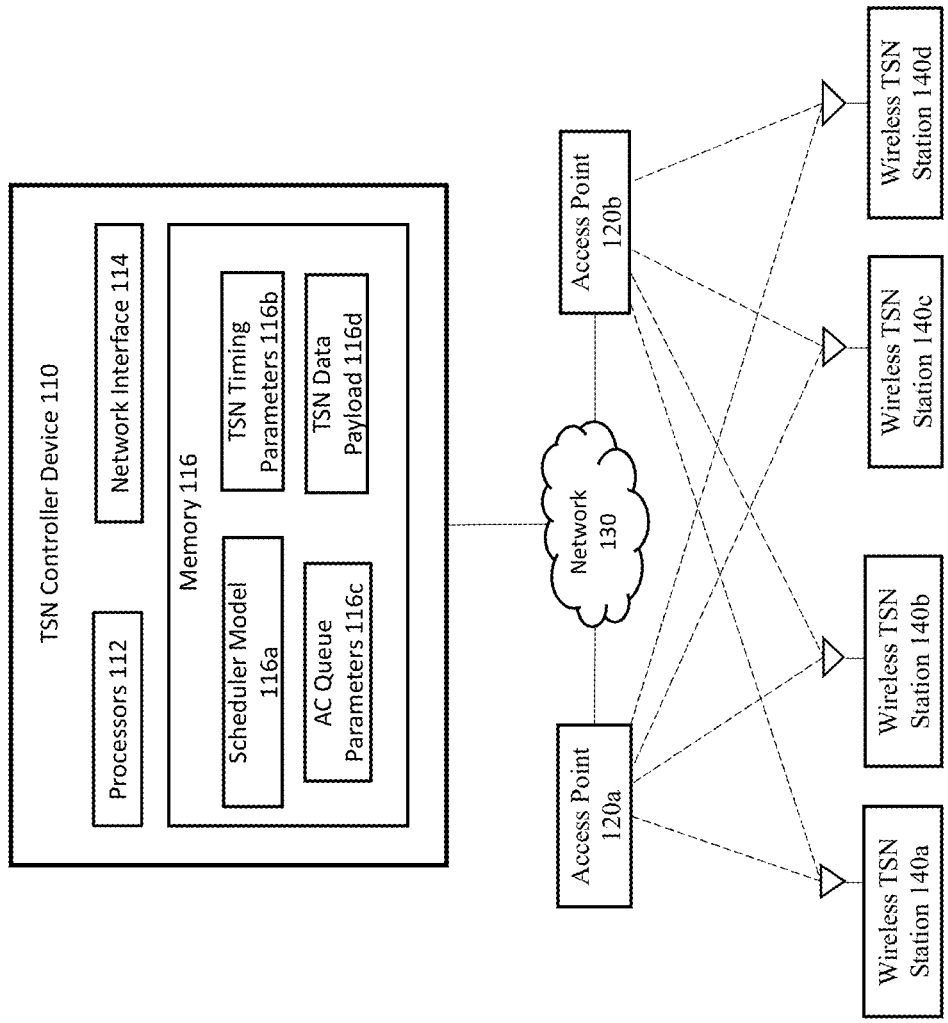
FIG. 1 illustrates an example wireless TSN network.

In some aspects, the techniques described herein relate to a system, including: one or more access points; and a time-sensitive networking (TSN) controller device in communication with the one or more access points, the TSN controller device including a memory and a processor, the processor communicatively coupled to the memory and configured to: receive a request from an access point to transmit to a TSN data payload from the access point to a wireless TSN station; identify a plurality of resource units (RUs) in a downlink channel associated with the access point, wherein each RU includes a set of RU tones in a bandwidth of the downlink channel; identify a plurality of access category (AC) queues; multiplex the plurality of RUs and the plurality of AC queues to generate a plurality of RU and AC queue pairs; generate a plurality of timing boundaries associated with the plurality of RU and AC queue pairs, wherein each timing boundary represents a combination of an average airtime of each RU and an average wait time of each AC queue for transmitting a size of the TSN data payload; iteratively validate the plurality of timing boundaries with a TSN lookahead time; and responsive to a first validation that a first timing boundary from a set of the timing boundaries is less than the TSN lookahead time, determine a first RU tone from a first RU associated with the first timing boundary to transmit the TSN data payload in a first AC queue to the wireless TSN station.

In some aspects, the techniques described herein relate to a system, and the TSN lookahead time is determined based on an IEEE 802.1Qbv lookahead timing rule to transmit the TSN data payload from the access point to the wireless TSN station.

In some aspects, the techniques described herein relate to a system, and the first timing boundary includes an average airtime of the first RU with a first high data rate and an average wait time of the first AC queue to transmit the TSN data payload to the wireless TSN station.

In some aspects, the techniques described herein relate to a system, and the processor is further configured to: responsive to a second validation that a second timing boundary from the set of the timing boundaries is less than the TSN lookahead time, identify a second RU tone of a second RU and a second AC queue associated with the second timing boundary. The second timing boundary includes an average airtime of the second RU with a second high data rate and an average wait time of the second AC queue for transmitting the TSN data payload to a plurality of wireless TSN stations.

In some aspects, the techniques described herein relate to a system, and the processor is further configured to: store the TSN data payload with an acknowledge timer in the first AC queue; store a replica of the TSN data payload with the acknowledge timer in the first AC queue; and transmit the TSN data payload in the first AC queue through the first RU to the wireless TSN station.

In some aspects, the techniques described herein relate to a system, and the processor is further configured to: determine whether an acknowledge message is received from the wireless TSN station within the first timing boundary; in response to determining that the acknowledge message is not received from the wireless TSN station within the first timing boundary, switch the first RU to the second RU in the downlink channel; and transmit the replica of the TSN data payload through the second RU in the first AC queue to the wireless TSN station.

In some aspects, the techniques described herein relate to a system, and each of the plurality of AC queues requires a unique average wait time to transmit the size of the TSN data payload to the wireless TSN station; and the plurality of RUs each includes a different number of tones associated with the downlink channel to transmit the TSN data payload from the access point to the wireless TSN station.

In some aspects, the techniques described herein relate to a method, including: receiving, by a time-sensitive networking (TSN) controller device, a request from an access point to transmit to a TSN data payload from the access point to a wireless TSN station; identifying, by the TSN controller device, a plurality of resource units (RUs) in a downlink channel associated with the access point, and each RU includes a set of RU tones in a bandwidth of the downlink channel; identifying, by the TSN controller device, a plurality of access category (AC) queues; multiplexing, by the TSN controller device, the plurality of RUs and the plurality of AC queues to generate a plurality of RU and AC queue pairs; generating, by the TSN controller device, a plurality of timing boundaries associated with the plurality of RU and AC queue pairs, and each timing boundary represents a combination of an average airtime of each RU and an average wait time of each AC queue for transmitting a size of the TSN data payload; iteratively validating, by the TSN controller device, the plurality of timing boundaries with a TSN lookahead time; and responsive to a first validation that a first timing boundary from a set of the timing boundaries is less than the TSN lookahead time, determining, by the TSN controller device, a first RU tone from a first RU associated with the first timing boundary to transmit the TSN data payload in a first AC queue to the wireless TSN station.

In some aspects, the techniques described herein relate to a method, and the TSN lookahead time is determined based on an IEEE 802.1Qbv lookahead timing rule to transmit the TSN data payload from the access point to the wireless TSN station.

In some aspects, the techniques described herein relate to a method, and the first timing boundary includes an average airtime of the first RU with a first high data rate and an average wait time of the first AC queue to transmit the TSN data payload to the wireless TSN station.

In some aspects, the techniques described herein relate to a method, further including: responsive to a second validation that a second timing boundary from the set of the timing boundaries is less than the TSN lookahead time, identifying, by the TSN controller device, a second RU tone of a second RU and a second AC queue associated with the second timing boundary, and the second timing boundary includes an average airtime of the second RU with a second high data rate and an average wait time of the second AC queue for transmitting the TSN data payload to a plurality of wireless TSN stations.

In some aspects, the techniques described herein relate to a method, further including: storing, by the TSN controller device, the TSN data payload with an acknowledge timer in the first AC queue; storing, by the TSN controller device, a replica of the TSN data payload with the acknowledge timer in the first AC queue; and transmitting, by the TSN controller device, the TSN data payload in the first AC queue through the first RU to the wireless TSN station.

In some aspects, the techniques described herein relate to a method, further including: determining, by the TSN controller device, whether an acknowledge message is received from the wireless TSN station within the first timing boundary; in response to determining that the acknowledge message is not received from the wireless TSN station within the first timing boundary, switching, by the TSN controller device, the first RU to the second RU in the downlink channel; and transmitting, by the TSN controller device, the replica of the TSN data payload through the second RU in the first AC queue to the wireless TSN station.

In some aspects, the techniques described herein relate to a method, and each of the plurality of AC queues requires a unique average wait time to transmit the size of the TSN data payload to the wireless TSN station; and the plurality of RUs each includes a different number of tones associated with the downlink channel to transmit the TSN data payload from the access point to the wireless TSN station.

In some aspects, the techniques described herein relate to a non-transitory computer-readable medium including instructions that are configured, when executed by a processor, to: receive, by a time-sensitive networking (TSN) controller device, a request from an access point to transmit to a TSN data payload from the access point to a wireless TSN station; identify, by the TSN controller device, a plurality of resource units (RUs) in a downlink channel associated with the access point, and each RU includes a set of RU tones in a bandwidth of the downlink channel; identify, by the TSN controller device, a plurality of access category (AC) queues; multiplex, by the TSN controller device, the plurality of RUs and the plurality of AC queues to generate a plurality of RU and AC queue pairs; generate, by the TSN controller device, a plurality of timing boundaries associated with the plurality of RU and AC queue pairs, and each timing boundary represents a combination of an average airtime of each RU and an average wait time of each AC queue for transmitting a size of the TSN data payload; iteratively validate, by the TSN controller device, the plurality of timing boundaries with a TSN lookahead time; and responsive to a first validation that a first timing boundary from a set of the timing boundaries is less than the TSN lookahead time, determine, by the TSN controller device, a first RU tone from a first RU associated with the first timing boundary to transmit the TSN data payload in a first AC queue to the wireless TSN station.

In some aspects, the techniques described herein relate to a non-transitory computer-readable medium, and the TSN lookahead time is determined based on an IEEE 802.1Qbv lookahead timing rule to transmit the TSN data payload from the access point to the wireless TSN station.

In some aspects, the techniques described herein relate to a non-transitory computer-readable medium, and the first timing boundary includes an average airtime of the first RU with a first high data rate and an average wait time of the first AC queue to transmit the TSN data payload to the wireless TSN station.

In some aspects, the techniques described herein relate to a non-transitory computer-readable medium, further including instructions that are configured, when executed by a processor, to: responsive to a second validation that a second timing boundary from the set of the timing boundaries is less than the TSN lookahead time, identify, by the TSN controller device, a second RU tone of a second RU and a second AC queue associated with the second timing boundary, and the second timing boundary includes an average airtime of the second RU with a second high data rate and an average wait time of the second AC queue for transmitting the TSN data payload to a plurality of wireless TSN stations In some aspects, the techniques described herein relate to a non-transitory computer-readable medium, further including instructions that are configured, when executed by a processor, to: store, by the TSN controller device, the TSN data payload with an acknowledge timer in the first AC queue; store, by the TSN controller device, a replica of the TSN data payload with the acknowledge timer in the first AC queue; and transmit, by the TSN controller device, the TSN data payload in the first AC queue through the first RU to the wireless TSN station.

In some aspects, the techniques described herein relate to a non-transitory computer-readable medium, further including instructions that are configured, when executed by a processor, to: determine, by the TSN controller device, whether an acknowledge message is received from the wireless TSN station within the first timing boundary; in response to determining that the acknowledge message is not received from the wireless TSN station within the first timing boundary, switch, by the TSN controller device, the first RU to the second RU in the downlink channel; and transmit, by the TSN controller device, the replica of the TSN data payload through the second RU in the first AC queue to the wireless TSN station.

Technical advantages of certain embodiments of this disclosure may include one or more of the following. Certain systems and methods described herein may minimize transmission latency over wireless networks by send information of forward error correction on separated resource units in parallel to the frame. Certain embodiments may utilize Wi-Fi6/7 AP's scheduler bounded time-based analysis to meet the TSN requirements both from a deterministic traffic delivery perspective and also from a reliable downlink traffic scheduling perspective in an IOT deployment to handle TSN traffic.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

In a time-sensitive networking (TSN)-based IOT deployment with 802.11ax, access-point scheduling techniques may be not able to handle TSN traffic to the devices such as Wi-Fi stations to guarantee deterministic packet delivery within a bounded delay interval. Though 802.1Qbv defines time-aware traffic shaping for wired ethernet-based TSN, there may be no Wi-Fi equivalent technique to guarantee end-to-end deterministic packet delivery both from a traffic scheduling perspective and from a reliable Wi-Fi link reliability perspective (i.e., wireless path reliability). The existing frame replication and elimination for reliability (FRER) method may be a static (parallel) redundancy high availability capability as defined in the IEEE 802.1CB-2017 standard. However, this method may be only designed for wired networks, not for Wi-Fi networks.

The criteria of bounded delay may be an important condition for real-time applications that use TSN in industrial IOT networking system. As the name implies, there is a time period in which the packet should be transmitted and received at the endpoint device (e.g., the wireless stations). In a Wi-Fi system, it may not be possible to guarantee frame transmission in a certain time period because the radio resources may not be allocated in a dedicated manner to any specific station. Therefore, it may be challenging to meet the bounded delay requirements in real-world scenarios. Since TSN traffic needs to be delivered within a bounded delay limit, if the packets are kept waiting in the system because the Wi-Fi system cannot serve them as fast as possible, there may be no need to send these delayed packets after the time period for delivery has expired.

Even though link adaptation algorithms such as Minstrel help to optimize the data rate in WLANs for time-sensitive traffic transmission, this may create a problem of bounded delay. The transmissions before choosing the best/optimum modulation and coding scheme (MCS) may cause packet losses and changing the MCS may cause delay variation eventually creating jitter. This may expose the bounded delay problem even further when handling TSN traffic in wireless systems.

To address the aforementioned problems, the embodiments disclosed herein may extend Wi-Fi6/7 scheduling mechanism in a way that meets the TSN requirements both from a deterministic traffic delivery perspective and also from a reliable downlink traffic scheduling perspective in an IOT setting.

FIG. 1 illustrates an example wireless TSN network 100. The wireless TSN network 100 may include a plurality of APs 120 under management by a TSN controller device 110. The TSN controller device 110 may comprise one or more processors 112, a network interface 114, and a memory 116. The memory 116 may store a scheduler model 116a, one or more TSN timing parameters 116b, one or more access category (AC) queue parameters 116c, and a TSN data payload 116d.

In particular embodiments, the TSN controller device 110 may control or manage a plurality of APs 120 including AP 120a and AP 120b (among other APs not shown in FIG. 1). While the various embodiments described herein are described in relation to two APs (e.g., APs 120), the methods and functions may also apply to three or more APs 120 providing TSN. A network 130 may provide control and network access to APs 120. The network access may include both internal networks (e.g., an intranet) and external networks (e.g., the Internet, wide area networks, etc.). The APs 120 may in turn provide network access to a device such as a wireless TSN station (STA) 140a, 140b, 140c, or 140d. The wireless TSN station 140 may include any TSN compatible programmable logic controller (PLC) station which has a Wi-Fi interface (NIC). NICs (e.g., wireless network cards) may be included in the hardware interfaces. In some examples, the TSN controller device 110 and the APs 120 may also provide control messaging to the wireless TSN stations 140 in addition to network access. In particular embodiments, the TSN controller device 110 may receive data from different APs 120.

This disclosure provides embodiments to implement deterministic traffic delivery and wireless path reliability in a wireless TSN network 100 as shown in FIG. 1. The TSN data payload may be transmitted and received at an endpoint device such a wireless TSN station 140 in an IOT deployment in Wi-Fi networks. This disclosure also provides systems and methods for managing multiple deterministic time-sensitive traffic deliveries to a plurality of wireless TSN stations 140 in the wireless TSN network 100. The TSN data payloads may be delivered within a bounded timing interval or boundary to meet the TSN requirements.

In particular embodiments, the deterministic TSN traffic delivery may be implemented to transmit a TSN data payload from an AP 120 to one or more wireless TSN stations 140 as follows. In particular embodiments, the AP 120 may collect information of resource units (RUs) in a primary channel and exchange such information to the TSN controller device 110. There may be several RUs with different sizes, i.e., each RU may comprise a different set of tones or subcarriers. As an example and not by way of limitation, each RU may comprise a number of 26, 52, 106, 242, 484, or 996 tones or subcarriers. In particular embodiments, each RU may be associated with an average airtime for transmitting a TSN data payload. The controller device 110 may record historical average airtime for transmitting a TSN data payload.

In particular embodiments, TSN traffic may be associated with a plurality of AC queues. As an example and not by way of limitation, the plurality of the AC queues may comprise a voice AC queue, a video AC queue, a best effort AC queue, and a background AC queue. Each AC queue may maintain a replica of TSN data payloads and a watchdog timer before which the AC queue has to be received for a TSN data payload. The replica of the TSN data payloads may validate if the uplink acknowledgement within the TSN transmission duration is received. If an acknowledgement is received within the TSN transmission duration and before the watchdog timer expiry, the replica of the TSN data payloads maintained in the same AC queue may be flushed. If an uplink acknowledgement is not received within the TSN transmission duration, the replica of the TSN data payloads may be sent in the downlink direction from the AP 120.

In particular embodiments, TSN data payloads in AC queues may be transmitted through an RU. For each type of AC queue, there may be a historical average wait time for transmitting a TSN data payload. In particular embodiments, each of the plurality of the AC queues may require a unique average wait time to transmit the size of the TSN data payload to the wireless TSN station 140. The plurality of the RUs may each include a different number of tones to transmit the TSN data payload from the access point 120 to the wireless TSN station 140. The first timing boundary may comprise an average airtime of the first RU and an average wait time of a first AC queue associated with a first pair of RU and AC queue.

Since TSN traffic may not have a dedicated queue, it may not have a dedicated access category. As an example and not by way of limitation, when sending a video traffic in its video queue, it may take 100 microseconds. When sending a TSN data payload via the same video queue, it may still take 100 microseconds, which does not meet the TSN timing requirement. As a result, it may be important to have an average time for all access categories of a TSN traffic.

In particular embodiments, the TSN controller device 110 may determine multiple timing summation combinations for different RUs and AC queues in the primary channel by multiplexing them. Each timing summation combination may comprise a historical average airtime of each RU and a respective wait time for transmitting a TSN data payload associated with the respective access category to an end device.

Figure 2:
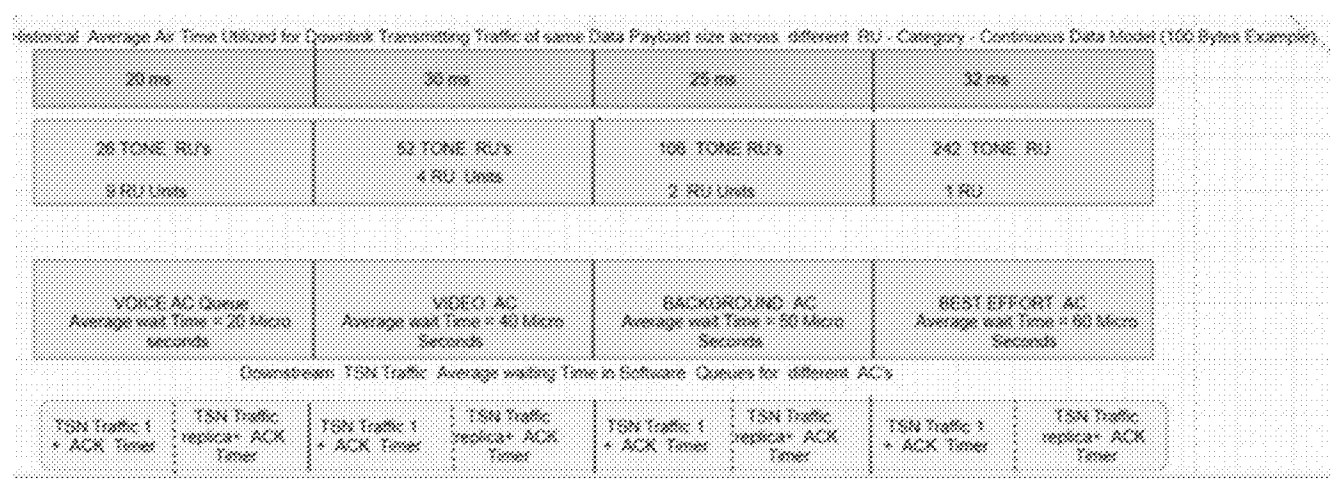

FIG. 2 illustrates an example TSN traffic scheduling map for end-to-end determinism. In the example shown in FIG. 2, there are four RUs, e.g., 26-tone RU comprising 9 RU units, 52-tone RU comprising 4 RU units, 106-tone RU comprising 2 RU units, and 242-tone RU comprising 1 RU unit. The historical average airtime utilized for downlink transmitting traffic of the same data payload size (e.g., a 100-byte TSN data payload) across different RUs may be 20 microseconds, 30 microseconds, 25 microseconds, and 32 microseconds for the four RUs, respectively. As shown in FIG. 2, there are four AC queues, i.e., voice AC queue, video AC queue, background AC queue, and best effort AC queue. As an example and not by way of limitation, each of the AC queues may comprise TSN traffic and acknowledge timer, and TSN traffic replica and the acknowledge timer. The downstream TSN traffic average wait time in software queues for the four access categories may be 20 microseconds, 40 microseconds, 50 microseconds, and 60 microseconds, respectively. According to the four RUs and four AC queues, there are 16 combinations.

In particular embodiments, the TSN controller device 110 may generate an airtime utilization-based RU template for different timing summation combinations of the primary channel's RU tones for different RU combinations. As an example and not by way of limitation, for the 26-tone RU, it may take on an average 20 microseconds on the 802.11ax AP 120 to complete the transmission of the TSN data payload. Then, the AP 120 may add this RU historical airtime with AC delay time for a particular AC queue, e.g., 40 microseconds for video AC queue. The resulted timing summation may be 60 microseconds.

In particular embodiments, the TSN controller device 110 may further validate the multiple timing summation combinations for different RUs with a predefined TSN lookahead time associated with a respective AC queue to determine an optimum RU for the corresponding AC queue to transmit a TSN data payload. As an example and not by way of limitation, the predefined TSN lookahead time may be a TSN schedule predefined by the 802.1 Qbv lookahead mechanism, which defines whether there is enough time to close the gate or not to meet the TSN timing deadline requirement. The AP 120 may compare each timing summation with the TSN lookahead time to determine whether this timing summation meets the TSN timing deadline requirements. If the outcome of this timing-based comparison and lookahead validation fails, the TSN data payload may not be forwarded on that particular AC queue (e.g., video AC queue) in an RU unit present in the 26-tone RU as selected for the current iteration. The validation may be iteratively performed across different RU-AC combinations available on the AP 120. Based on the validation outcome, a combination RU and AC queue meeting the TSN timing deadline requirements may be selected in real time for sending the TSN data payload in the downlink direction.

In particular embodiments, the 802.1 Qbv lookahead mechanism may help eliminate congestion and ensure that frames are delivered within the expected latency bounds, which may be extended to 802.11 to avoid congestion in a basic service set (BSS) and/or across managed BSSs. However, the existing extension of the 802.1 Qbv lookahead mechanism over the 802.11 medium may require modification in the 802.11 MAC layer to enable distribution of the Qbv schedule between managed stations and also to ensure the 802.11 EDCA (enhanced distributed channel access) queues are controlled to meet the 802.1 Qbv schedule. For instance, 802.15.4 TSCH uses Information Elements (IE) in beacons for that purpose. By contrast, the embodiments disclosed herein may extend the 802.1 Qbv lookahead mechanism to 802.11 by placing a same IE in all beacons regardless of the service set identifier (SSID), and by only placing aggregated time zones where the wireless TSN stations 140 are not allowed to contend for the medium. Wi-Fi devices that are not aware of orthogonal frequency-division multiple access (OFDMA) but are aware of time may understand the new beacons would refrain from contending in those time windows.

In particular embodiments, the AP 120 may comprise an embedded RU scheduler configured for scheduling a RU for transmitting a TSN data payload. The RU scheduler (may be an existing Wi-Fi 6 scheduler) may be used for TSN lookahead timing analysis. The scheduler may send a validation to the TSN controller device 110, which may further select the optimal RU based on the validation for a plurality of wireless TSN stations 140. The optimal RU may satisfy different TSN lookahead timing requirements associated with different wireless TSN stations 140 for traffic delivery. In particular embodiments, different wireless TSN stations 140 may have different TSN lookahead timing requirements. The optimal RU may be used to transmit the TSN traffic to each wireless TSN station 140 within a time interval less than the TSN lookahead time associated with that wireless TSN station 140 so that the TSN traffic may be transmitted to different wireless TSN stations 140 efficiently.

In particular embodiments, the scheduler may multiplex the TSN traffic in real-time and switch the traffic between different AC queues depending on which particular AC queue is empty at a given part of time. The scheduler may determine which particular AC queue is going to take less than the average airtime to send the TSN data payload. In particular embodiments, the AP 120 may transmit a TSN data payload using a primary RU tone and transmit a replica of the TSN data payload to a secondary RU. In particular embodiments, the scheduler may be used to control and switch between the primary RU and the secondary RU to transmit the TSN traffic efficiently.

In particular embodiments, the appropriate RU may be assigned only for handling the TSN data payload to one or more TSN endpoint devices (e.g., wireless TSN stations 140) by the AP 120 in the downlink scheduler queue. For normal Wi-Fi traffic (e.g., voice or video), the other RUs may be assigned by the AP 120 for downlink traffic scheduling.

In particular embodiments, based on the uplink and downlink timing slot map defined for every RU for a group of wireless TSN stations 140, the same replica of TSN data payload may be dual carrier modulated (DCM) by the 802.11ax AP 120. In other words, two copies of the TSN data payload may be sent on different RUs.

In particular embodiments, the TSN controller device 110 may utilize machine-learning technology (e.g., binary classification) to analyze the data pattern and determine which particular RU is an optimum RU to transmit a TSN data payload. The TSN controller device 110 may use a machine-learning model to determine an RU with a RU tone and an AC queue to transmit the TSN data payload to the wireless TSN station 140 through the downlink channel. As an example and not by way of limitation, the TSN controller device 110 may execute the machine-learning model to collect raw data and learn from the data between APs 120, RUs, etc. to determine the optimal RU.

In particular embodiments, upon identifying an optimal RU (e.g., 26-tone RU), the TSN controller device 110 may further select an optimal RU tone as a primary RU tone to send the TSN data payload. The TSN controller device 110 may first identify a first RU tone from all the tones in the optimal RU. The TSN controller device 110 may then select the first RU tone as a primary RU tone. The TSN controller device 110 may also select a second RU tone from the same RU or a different RU as a secondary RU tone. As an example and not by way of limitation, the TSN controller device 110 may select a RU tone with an average airtime of 4 microseconds as a primary RU tone and another RU tone with an average airtime of 5 microseconds as a secondary RU tone.

As there may be multiple APs 120, the TSN controller device 110 may determine the most optimal AP 120 to transmit the TSN data payload. As an example and not by way of limitation, the most optimal AP 120 may be changed from AP 120a to AP 120b. The TSN controller device 110 may send a roaming instruction from AP 120a to AP 120b and then schedule an RU associated with the AP 120b to transmit the TSN data payload to the corresponding wireless TSN stations 140.

In particular embodiments, when the AP 120 transmits a TSN data payload, the TSN controller device 110 may insert time slotted channel hopping (TSCH) information with forward error correction (FEC) data into the TSN data payload in an AC queue while the RU delivers the TSN data payload in a downlink direction to an existing wireless TSN station 140 associated with the AP 120. Sending the FEC data on separated RUs in parallel to the frame may minimize the latency, making it look like it is a different frame. When time permits, the FEC data may comprise a full second copy of the TSN data payload which may be seen as a proactive retry. Either way, a single acknowledgement may be expected for the separated packet and the FEC data.

Figure 3:
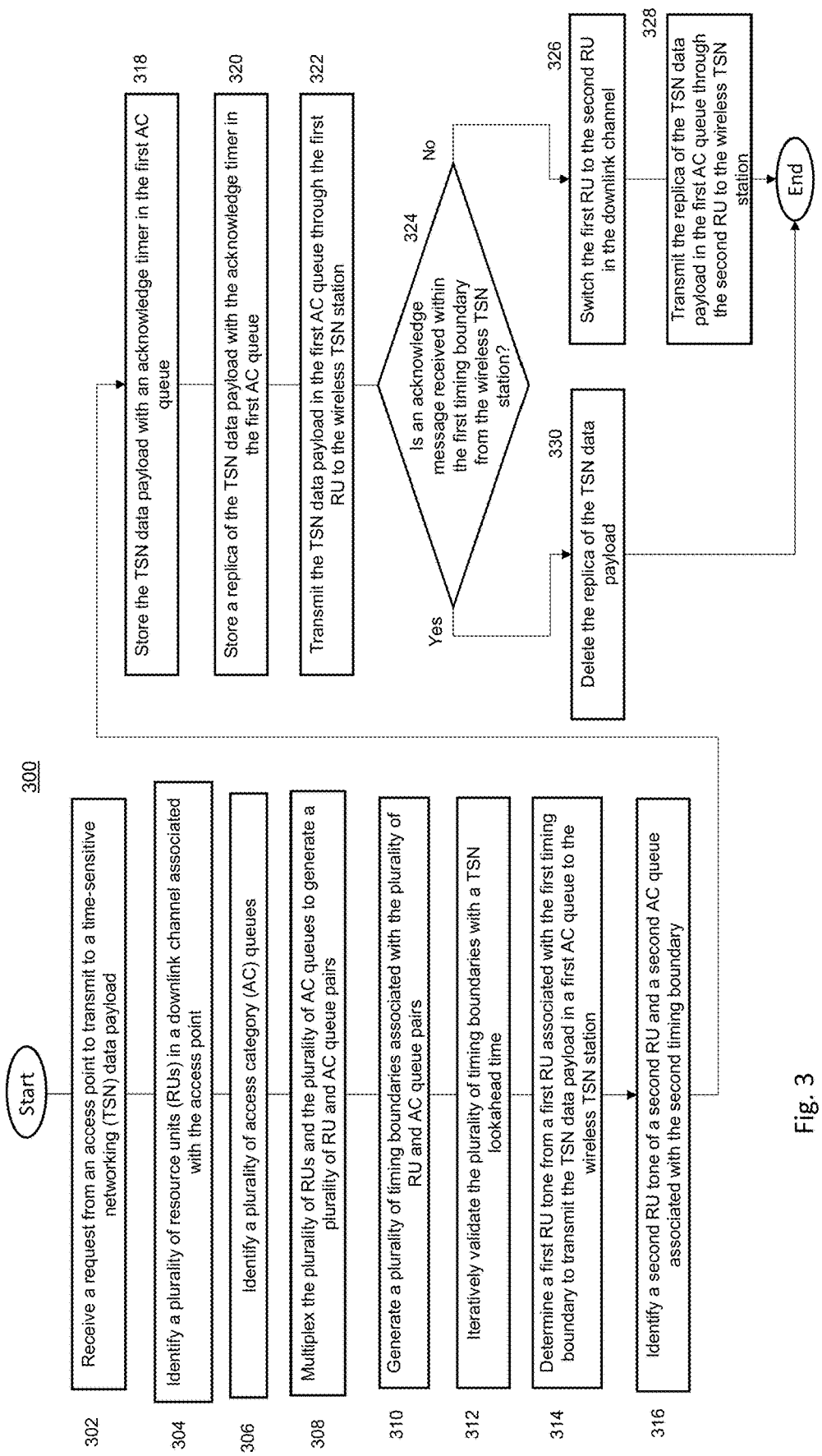
FIG. 3 illustrates an example method for transmitting a TSN data payload to a wireless TSN station.

FIG. 3 illustrates an example method 300 for transmitting a TSN data payload to a wireless TSN station 140. The method may start at step 302. At step 302, the TSN controller device 110 may receive a request from an access point 120 to transmit to a time-sensitive networking (TSN) data payload. At step 304, the TSN controller device 110 may identify a plurality of resource units (RUs) in a downlink channel associated with the access point 120. At step 306, the TSN controller device 110 may identify a plurality of access category (AC) queues. At step 308, the TSN controller device 110 may multiplex the plurality of RUs and the plurality of AC queues to generate a plurality of RU and AC queue pairs. At step 310, the TSN controller device 110 may generate a plurality of timing boundaries associated with the plurality of RU and AC queue pairs. At step 312, the TSN controller device 110 may iteratively validate the plurality of timing boundaries with a TSN lookahead time. At step 314, the TSN controller device 110 may determine a first RU tone from a first RU associated with the first timing boundary to transmit the TSN data payload in a first AC queue to the wireless TSN station 140. At step 316, the TSN controller device 110 may identify a second RU tone of a second RU and a second AC queue associated with the second timing boundary. At step 318, the TSN controller device 110 may store the TSN data payload with an acknowledge timer in the first AC queue. At step 320, the TSN controller device 110 may store a replica of the TSN data payload with the acknowledge timer in the first AC queue. At step 322, the TSN controller device 110 may transmit the TSN data payload in the first AC queue through the first RU to the wireless TSN station 140. At step 324, the TSN controller device 110 may determine whether an acknowledge message is received within the first timing boundary from the wireless TSN station 140. If an acknowledge message is not received, method 300 may proceed to step 326, where the TSN controller device 110 may switch the first RU to the second RU in the downlink channel. Further to step 328, the TSN controller device 110 may transmit the replica of the TSN data payload in the first AC queue through the second RU to the wireless TSN station 140. If an acknowledge message is received, method 300 may proceed to step 330, where the TSN controller device 110 may delete the replica of the TSN data payload. After step 328 or step 330, method 300 may end.

It is to be understood that one or more steps of method 300 may be executed by a TSN controller device. In other embodiments, the method may be executed by one or more components of a system, such as systems described in FIG. 1. In still other embodiments, the method 300 of FIG. 3 may be construed in view of the described systems and processes of FIG. 1.

It is to be understood that the order in which the method 300 is described is not intended to be construed as a limitation, and any number of the described method steps may be combined, modified, or carried out in any order to implement the method 300 or alternative methods. Additionally, individual steps may be deleted from the method 300 without departing from the spirit and scope of the subject matter described herein. Furthermore, the method 300 can be implemented in any suitable hardware, software, firmware, or combination thereof.

Figure 4:
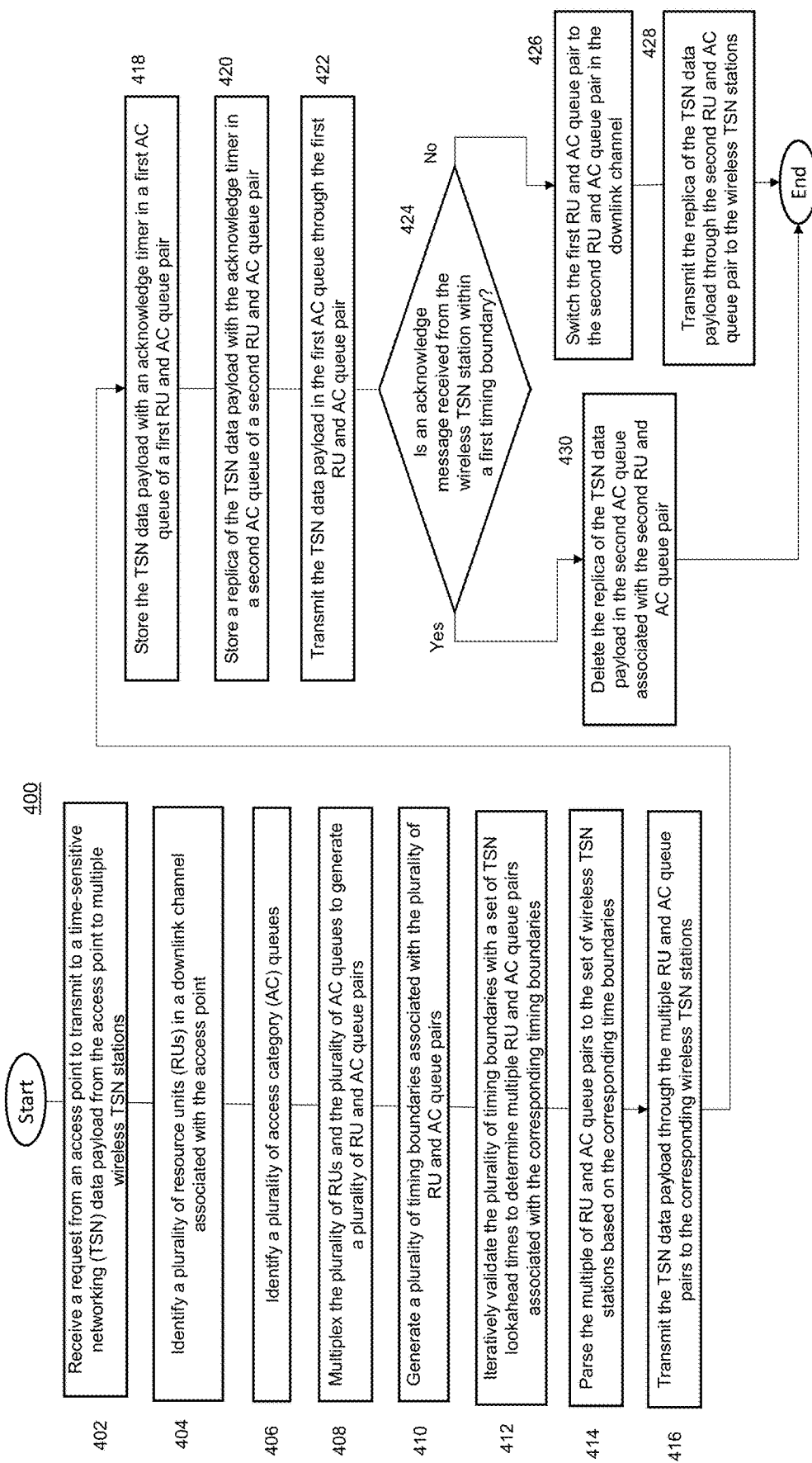
FIG. 4 illustrates an example method for transmitting a TSN data payload to multiple wireless TSN stations.

FIG. 4 illustrates an example method 400 for transmitting a TSN data payload to multiple wireless TSN stations 140. The method may start at step 402. At step 402, the TSN controller device 110 may receive a request from an access point 120 to transmit to a time-sensitive networking (TSN) data payload from the access point 120 to multiple wireless TSN stations 140. At step 404, the TSN controller device 110 may identify a plurality of resource units (RUS) in a downlink channel associated with the access point 120, wherein each RU comprises a set of RU tones in a bandwidth of the downlink channel. At step 406, the TSN controller device 110 may identify a plurality of access category (AC) queues. At step 408, the TSN controller device 110 may multiplex the plurality of RUs and the plurality of AC queues to generate a plurality of RU and AC queue pairs. At step 410, the TSN controller device 110 may generate a plurality of timing boundaries associated with the plurality of RU and AC queue pairs. At step 412, the TSN controller device 110 may iteratively validate the plurality of timing boundaries with a set of TSN lookahead times to determine multiple RU and AC queue pairs associated with the corresponding timing boundaries. In particular embodiments, the set of the TSN lookahead times may be determined based on an IEEE 802.1Qbv lookahead timing rule to transmit the TSN data payload from the access point 120 to the multiple wireless TSN stations 140. Each wireless TSN station 140 may require a particular timing boundary associated with a corresponding TSN lookahead time.

At step 414, the TSN controller device 110 may parse the multiple of RU and AC queue pairs to the set of wireless TSN stations 140 based on the corresponding time boundaries. At step 416, the TSN controller device 110 may transmit the TSN data payload through the multiple RU and AC queue pairs to the corresponding wireless TSN stations 140. At step 418, the TSN controller device 110 may store the TSN data payload with an acknowledge timer in a first AC queue of a first RU and AC queue pair. At step 420, the TSN controller device 110 may store a replica of the TSN data payload with the acknowledge timer in a second AC queue of a second RU and AC queue pair. At step 422, the TSN controller device 110 may transmit the TSN data payload in the first AC queue through the first RU and AC queue pair. At step 424, the TSN controller device 110 may determine whether an acknowledge message is received within the first timing boundary from the wireless TSN station 140. If an acknowledge message is not received, method 400 may proceed to step 426, where the TSN controller device 110 may switch the first RU and AC queue pair to the second RU and AC queue pair in the downlink channel. Further to step 428, the TSN controller device 110 may transmit the replica of the TSN data payload through the second RU and AC queue pair to the wireless TSN stations 140. If an acknowledge message is received, method 400 may proceed to step 430, where the TSN controller device 110 may delete the replica of the TSN data payload in the second AC queue associated with the second RU and AC queue pair. After step 428 or step 430, method 400 may end.

It is to be understood that one or more steps of method 400 may be executed by a TSN controller device. In other embodiments, the method may be executed by one or more components of a system, such as systems described in FIG. 1. In still other embodiments, the method 400 of FIG. 4 may be construed in view of the described systems and processes of FIG. 1.

It is to be understood that the order in which the method 400 is described is not intended to be construed as a limitation, and any number of the described method steps may be combined, modified, or carried out in any order to implement the method 400 or alternative methods. Additionally, individual steps may be deleted from the method 400 without departing from the spirit and scope of the subject matter described herein. Furthermore, the method 300 can be implemented in any suitable hardware, software, firmware, or combination thereof.

Figure 5:
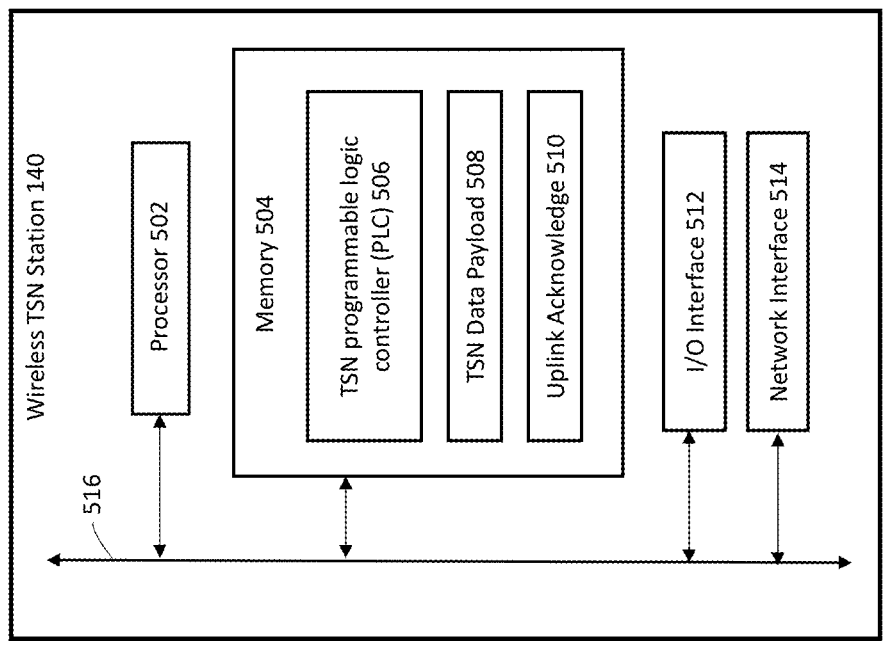
FIG. 5 illustrates an example wireless TSN station.

FIG. 5 illustrates an example wireless TSN station 140. Wireless station 140 may comprise a processor 502, a memory 504, an I/O interface 512, and a network interface 514, and an internal bus or other circuitry 516 to communicate data between components within the wireless station 140. In general, the I/O interface 512 or network interface 514 (which may include a wired or wireless interface to communicate with switches, routers, or other components of a network) may receive input and provide output to facilitate communication between devices or components, processor 502 may execute program code to perform the functionality of the device, and memory 504 may store information. The I/O interface 512 or network interface 514 may be configured to use any suitable type of communication protocol and may comprise any suitable protocol converter, modem, and/or other logic to receive an input and provide an output.

Processor 502 may comprise any electronic circuitry including, but not limited to, one or more processors, microprocessors, microcontrollers, central processing unit (CPU) chips, state machines, logic units, cores (e.g. a multi-core processor), field-programmable gate array (FPGAs), application specific integrated circuits (ASICs), digital hardware, digital signal processors (DSPs), special-purpose digital logic, any suitable hardware and/or software for processing data, or a combination of the preceding. Processor 502 may be configured to execute program code stored in memory 504, respectively, which may include one or several types of memory such as read-only memory (ROM), random-access memory (RAM), cache memory, flash memory devices, optical storage devices, non-transitory computer readable media, etc. Program code stored in memory may include instructions (such as logic, rules, etc.) for executing one or more telecommunications and/or data communications protocols as well as instructions for carrying out one or more of the techniques described herein.

In certain embodiments, memory 504 of AP 120 may store TSN programmable logic controller (PLC) 506, TSN data payload 508, and uplink acknowledge 510. Processor 502 may be configured to execute TSN programmable logic controller (PLC) 506 in order to transmit the TSN data payload 508.

Modifications, additions, or omissions may be made to the devices shown in FIG. 5. More generally, the components of a device may be integrated or separated. Moreover, the functionality of a device may be performed by more, fewer, or other components. The components within a device may be communicatively coupled in any suitable manner.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system, comprising:
one or more access points; and
a time-sensitive networking (TSN) controller device in communication with the one or more access points, the TSN controller device comprising a memory and a processor, the processor communicatively coupled to the memory and configured to:
receive a request from an access point to transmit to a TSN data payload from the access point to a wireless TSN station;
identify a plurality of resource units (RUS) in a downlink channel associated with the access point, wherein each RU comprises a set of RU tones in a bandwidth of the downlink channel;
identify a plurality of access category (AC) queues;
multiplex the plurality of RUs and the plurality of AC queues to generate a plurality of RU and AC queue pairs;
generate a plurality of timing boundaries associated with the plurality of RU and AC queue pairs, wherein each timing boundary represents a combination of an average airtime of each RU and an average wait time of each AC queue for transmitting a size of the TSN data payload;
iteratively validate the plurality of timing boundaries with a TSN lookahead time; and
responsive to a first validation that a first timing boundary from a set of the timing boundaries is less than the TSN lookahead time, determine a first RU tone from a first RU associated with the first timing boundary to transmit the TSN data payload in a first AC queue to the wireless TSN station.

2. The system of claim 1, wherein the processor is further configured to:
responsive to a second validation that a second timing boundary from the set of the timing boundaries is less than the TSN lookahead time, identify a second RU tone of a second RU and a second AC queue associated with the second timing boundary, wherein the second timing boundary comprises an average airtime of the second RU with a second high data rate and an average wait time of the second AC queue for transmitting the TSN data payload to a plurality of wireless TSN stations.

3. The system of claim 2, wherein the processor is further configured to:
store the TSN data payload with an acknowledge timer in the first AC queue;
store a replica of the TSN data payload with the acknowledge timer in the first AC queue; and
transmit the TSN data payload in the first AC queue through the first RU to the wireless TSN station.

4. The system of claim 3, wherein the processor is further configured to:
determine whether an acknowledge message is received from the wireless TSN station within the first timing boundary;
in response to determining that the acknowledge message is not received from the wireless TSN station within the first timing boundary, switch the first RU to the second RU in the downlink channel; and
transmit the replica of the TSN data payload through the second RU in the first AC queue to the wireless TSN station.

5. The system of claim 1, wherein the TSN lookahead time is determined based on an IEEE 802.1Qbv lookahead timing rule to transmit the TSN data payload from the access point to the wireless TSN station.

6. The system of claim 1, wherein the first timing boundary comprises an average airtime of the first RU with a first high data rate and an average wait time of the first AC queue to transmit the TSN data payload to the wireless TSN station.

7. The system of claim 1, wherein each of the plurality of AC queues requires a unique average wait time to transmit the size of the TSN data payload to the wireless TSN station; and wherein the plurality of RUs each includes a different number of tones associated with the downlink channel to transmit the TSN data payload from the access point to the wireless TSN station.

8. A method, comprising:
receiving, by a time-sensitive networking (TSN) controller device, a request from an access point to transmit to a TSN data payload from the access point to a wireless TSN station;
identifying, by the TSN controller device, a plurality of resource units (RUs) in a downlink channel associated with the access point, wherein each RU comprises a set of RU tones in a bandwidth of the downlink channel;
identifying, by the TSN controller device, a plurality of access category (AC) queues;
multiplexing, by the TSN controller device, the plurality of RUs and the plurality of AC queues to generate a plurality of RU and AC queue pairs;
generating, by the TSN controller device, a plurality of timing boundaries associated with the plurality of RU and AC queue pairs, wherein each timing boundary represents a combination of an average airtime of each RU and an average wait time of each AC queue for transmitting a size of the TSN data payload;
iteratively validating, by the TSN controller device, the plurality of timing boundaries with a TSN lookahead time; and
responsive to a first validation that a first timing boundary from a set of the timing boundaries is less than the TSN lookahead time, determining, by the TSN controller device, a first RU tone from a first RU associated with the first timing boundary to transmit the TSN data payload in a first AC queue to the wireless TSN station.

9. The method of claim 8, wherein the TSN lookahead time is determined based on an IEEE 802.1Qbv lookahead timing rule to transmit the TSN data payload from the access point to the wireless TSN station.

10. The method of claim 8, wherein the first timing boundary comprises an average airtime of the first RU with a first high data rate and an average wait time of the first AC queue to transmit the TSN data payload to the wireless TSN station.

11. The method of claim 8, further comprising:
responsive to a second validation that a second timing boundary from the set of the timing boundaries is less than the TSN lookahead time, identifying, by the TSN controller device, a second RU tone of a second RU and a second AC queue associated with the second timing boundary, wherein the second timing boundary comprises an average airtime of the second RU with a second high data rate and an average wait time of the second AC queue for transmitting the TSN data payload to a plurality of wireless TSN stations.

12. The method of claim 8, further comprising:
storing, by the TSN controller device, the TSN data payload with an acknowledge timer in the first AC queue;
storing, by the TSN controller device, a replica of the TSN data payload with the acknowledge timer in the first AC queue; and
transmitting, by the TSN controller device, the TSN data payload in the first AC queue through the first RU to the wireless TSN station.

13. The method of claim 8, further comprising:
determining, by the TSN controller device, whether an acknowledge message is received from the wireless TSN station within the first timing boundary;
in response to determining that the acknowledge message is not received from the wireless TSN station within the first timing boundary, switching, by the TSN controller device, the first RU to a second RU in the downlink channel; and
transmitting, by the TSN controller device, a replica of the TSN data payload through the second RU in the first AC queue to the wireless TSN station.

14. The method of claim 8, wherein each of the plurality of AC queues requires a unique average wait time to transmit the size of the TSN data payload to the wireless TSN station; and wherein the plurality of RUs each includes a different number of tones associated with the downlink channel to transmit the TSN data payload from the access point to the wireless TSN station.

15. A non-transitory computer-readable medium comprising instructions that are configured, when executed by a processor, to:
receive, by a time-sensitive networking (TSN) controller device, a request from an access point to transmit to a TSN data payload from the access point to a wireless TSN station;
identify, by the TSN controller device, a plurality of resource units (RUs) in a downlink channel associated with the access point, wherein each RU comprises a set of RU tones in a bandwidth of the downlink channel;
identify, by the TSN controller device, a plurality of access category (AC) queues;
multiplex, by the TSN controller device, the plurality of RUs and the plurality of AC queues to generate a plurality of RU and AC queue pairs;
generate, by the TSN controller device, a plurality of timing boundaries associated with the plurality of RU and AC queue pairs, wherein each timing boundary represents a combination of an average airtime of each RU and an average wait time of each AC queue for transmitting a size of the TSN data payload;
iteratively validate, by the TSN controller device, the plurality of timing boundaries with a TSN lookahead time; and
responsive to a first validation that a first timing boundary from a set of the timing boundaries is less than the TSN lookahead time, determine, by the TSN controller device, a first RU tone from a first RU associated with the first timing boundary to transmit the TSN data payload in a first AC queue to the wireless TSN station.

16. The non-transitory computer-readable medium of claim 15, wherein the TSN lookahead time is determined based on an IEEE 802.1Qbv lookahead timing rule to transmit the TSN data payload from the access point to the wireless TSN station.

17. The non-transitory computer-readable medium of claim 15, wherein the first timing boundary comprises an average airtime of the first RU with a first high data rate and an average wait time of the first AC queue to transmit the TSN data payload to the wireless TSN station.

18. The non-transitory computer-readable medium of claim 15, further comprising instructions that are configured, when executed by a processor, to:
responsive to a second validation that a second timing boundary from the set of the timing boundaries is less than the TSN lookahead time, identify, by the TSN controller device, a second RU tone of a second RU and a second AC queue associated with the second timing boundary, wherein the second timing boundary comprises an average airtime of the second RU with a second high data rate and an average wait time of the second AC queue for transmitting the TSN data payload to a plurality of wireless TSN stations.

19. The non-transitory computer-readable medium of claim 15, further comprising instructions that are configured, when executed by a processor, to:
store, by the TSN controller device, the TSN data payload with an acknowledge timer in the first AC queue;
store, by the TSN controller device, a replica of the TSN data payload with the acknowledge timer in the first AC queue; and
transmit, by the TSN controller device, the TSN data payload in the first AC queue through the first RU to the wireless TSN station.

20. The non-transitory computer-readable medium of claim 15, further comprising instructions that are configured, when executed by a processor, to:
determine, by the TSN controller device, whether an acknowledge message is received from the wireless TSN station within the first timing boundary;
in response to determining that the acknowledge message is not received from the wireless TSN station within the first timing boundary, switch, by the TSN controller device, the first RU to a second RU in the downlink channel; and
transmit, by the TSN controller device, a replica of the TSN data payload through the second RU in the first AC queue to the wireless TSN station.

* * * * *